(12) United States Patent
Mileva et al.

(10) Patent No.: US 11,396,593 B2
(45) Date of Patent: Jul. 26, 2022

(54) FOAMABLE POLYPROPYLENE COMPOSITIONS

(71) Applicant: BOREALIS AG, Vienna (AT)

(72) Inventors: Daniela Mileva, Linz (AT); Susanne Kahlen, Linz (AT); Patrick Rover, Linz (AT); Georg Grestenberger, Linz (AT); Jingbo Wang, Linz (AT); Klaus Bernreitner, Linz (AT); Markus Gahleitner, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 17/273,511

(22) PCT Filed: Oct. 2, 2019

(86) PCT No.: PCT/EP2019/076674
§ 371 (c)(1),
(2) Date: Mar. 4, 2021

(87) PCT Pub. No.: WO2020/074333
PCT Pub. Date: Apr. 16, 2020

(65) Prior Publication Data
US 2021/0340365 A1 Nov. 4, 2021

(30) Foreign Application Priority Data
Oct. 8, 2018 (EP) .................................... 18199115

(51) Int. Cl.
| | | |
|---|---|---|
| *C08L 23/12* | (2006.01) | |
| *C08F 110/06* | (2006.01) | |
| *C08J 9/00* | (2006.01) | |
| *C08K 3/04* | (2006.01) | |
| *C08K 5/134* | (2006.01) | |
| *C08K 5/526* | (2006.01) | |

(52) U.S. Cl.
CPC ............ *C08L 23/12* (2013.01); *C08F 110/06* (2013.01); *C08J 9/0066* (2013.01); *C08K 3/04* (2013.01); *C08K 5/1345* (2013.01); *C08K 5/526* (2013.01); *C08F 2410/01* (2013.01); *C08J 2323/12* (2013.01); *C08J 2423/12* (2013.01); *C08L 2203/14* (2013.01); *C08L 2205/025* (2013.01); *C08L 2205/24* (2013.01)

(58) Field of Classification Search
CPC ................ C08L 23/12; C08L 2203/14; C08L 2205/025; C08L 2205/24; C08F 110/06; C08F 2410/01; C08F 2420/07; C08F 4/65908; C08F 4/65912; C08F 4/65927; C08J 9/0066; C08J 2323/12; C08J 2423/12; C08K 3/04; C08K 5/1345; C08K 5/526
See application file for complete search history.

(56) References Cited

U.S. PATENT DOCUMENTS

| | | | | |
|---|---|---|---|---|
| 6,086,982 A | * | 7/2000 | Peiffer | ..................... B32B 27/18 428/213 |
| 6,537,652 B1 | * | 3/2003 | Kochem | ..................... C08J 5/18 428/220 |
| 2009/0136714 A1 | * | 5/2009 | Itou | ............................ C08J 5/18 428/152 |
| 2013/0303684 A1 | * | 11/2013 | Gloger | ..................... H01G 4/18 524/570 |

FOREIGN PATENT DOCUMENTS

| | | |
|---|---|---|
| EP | 3476888 A1 | 5/2019 |
| WO | 1994/0014856 A1 | 7/1994 |
| WO | 1995/0012622 A1 | 5/1995 |
| WO | 2002/0002576 A1 | 1/2002 |
| WO | 2003/0051934 A3 | 6/2003 |
| WO | 2004033509 A1 | 4/2004 |
| WO | 2006/0097497 A1 | 9/2006 |
| WO | 2007/0116034 A1 | 10/2007 |
| WO | 2011/0076780 A1 | 6/2011 |
| WO | 2011/0135004 A1 | 11/2011 |
| WO | 2012/0001052 A3 | 1/2012 |
| WO | 2012/0084961 A1 | 6/2012 |
| WO | 2012084768 A1 | 6/2012 |
| WO | 2012093099 A1 | 7/2012 |
| WO | 2013/0007650 A1 | 1/2013 |
| WO | 2015/0011135 A1 | 1/2015 |
| WO | 2015011135 A1 | 1/2015 |

(Continued)

OTHER PUBLICATIONS

Tranchida et al., "Influence of 2,1-erythro regiodefects on the crystallization behavior of isotactic polypropylene," Polymer Crystallization, Wiley Periodicals, Sep. 24, 2018 (Year: 2018).*
Applicant Borealis AG; Foamable Polypropylene Compositions; European Patent Application No. 18199115; Extended European Search Report; dated Mar. 15, 2019; 5 pgs.
Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28, 1128-1137.

(Continued)

*Primary Examiner* — Kara B Boyle
(74) *Attorney, Agent, or Firm* — Tarolli, Sundheim, Covell & Tummino LLP

(57) ABSTRACT

The present invention relates to a polypropylene composition, an injection molded article comprising the polypropylene composition, a foamed article comprising the polypropylene composition as well as the use of a polypropylene homopolymer (H-PP1) for reducing the 5stiffness reduction factor of a foamed injection molded article by at least 40 as determined by the difference of the flexural modulus measured according to ISO 178 of the non-foamed and foamed injection molded article and compared to an article comprising the same amount of a polypropylene which has been polymerized in the presence of a Ziegler-Natta catalyst.

13 Claims, No Drawings

(56) References Cited

FOREIGN PATENT DOCUMENTS

WO      2015/0158790 A2   10/2015
WO       2016116606 A1    7/2016

OTHER PUBLICATIONS

Cheng, et al., "13C NMR Analysis of Ethylene-Propylene Rubbers", Macromolecules 17, 1984, 1950-1955.
Kakugo, Masahiro, et al., "13C NMR Determination of Monomer Sequence Distribution in Ethylene-Propylene Copolymers Prepared With d-TiC13-Al(C2H5)2 Cl" Macromolecules 1982, 15, 1150-1152.
Resconi, Luigi, et al., "Selectivity in Propane Polymerization With Metallocene Catalysts", Chem. Rev. 2000, 100, 1253-1345.
Wang, Wen-Jun, et al., "Structural Analysis of Ethylene/Propylene Copolymers Synthesized With a Constrained Geometry Catalyst", Macromolecules 2000, 33, 1157-1162.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
Dr. Hans Zweifel; Plastics Additives Handbook 5th Edition; Hanser Gardner Publications, Inc.; ISBN-10 : 156990295X; ISBN-13 : 978-1569902950; Jan. 1, 2001; 7 pgs.

\* cited by examiner

FOAMABLE POLYPROPYLENE COMPOSITIONS

The present invention relates to a polypropylene composition, an injection molded article comprising the polypropylene composition, a foamed article comprising the polypropylene composition as well as the use of a polypropylene homopolymer (H-PP1) for reducing the stiffness reduction factor of a foamed injection molded article by at least 40 as determined by the difference of the flexural modulus measured according to ISO 178 of the non-foamed and foamed injection molded article and compared to an article comprising the same amount of a polypropylene which has been polymerized in the presence of a Ziegler-Natta catalyst.

Polypropylene is used in many applications and is for instance the material of choice in many fields such as automotive applications because they can be tailored to specific purposes needed. However, the recent demand in plastic industry is towards weight reduction. Foaming of polymer compounds via injection-molding (FIM) technology gains wide interest both scientifically and industrially due to its capability to produce low-density parts with high geometrical accuracy and improved dimensional stability. With this technique, a product with a cellular core and solid skin can be molded in a single operation. Basically, FIM includes the use of an inert gas that is to be dispersed in the polymer melt or by pre-blending a resin with a chemical blowing (or foaming) agent which under heat releases inert gas. The gas bubbles then expand within the melt, filling the mould and creating the internal cellular structure. In injection molding of thermoplastics containing a blowing agent the mixture is held under sufficient back pressure to retain the gas and prevent premature expansion. Depending on the weight requirements, a specific amount of material is dosed and the melt is injected into the mold. The entrapped gas expands as soon as the melt/gas mixture enters the empty mould unless a sufficiently high enough counter pressure is applied. Achieving uniform and high-cell-density microstructure, which is critical for obtaining superior mechanical properties and excellent emissions in foamed plastics is challenging in FIM and can be controlled by process conditions. The influence of process conditions such as blowing agent content, mould temperature, melt temperature, injection pressure, and back pressure were varied in order to produce high quality foam in terms of low skin thickness, small cell sizes, and narrow cell size distribution is well known. However, the influence of polymer design on the foamed structure and emissions has been rarely investigated so far.

As a result, polypropylene compositions with excellent foamability are still desired. Furthermore, it is desired that these polypropylene compositions have a low volatile content and good balance of mechanical properties.

The finding of the present invention is that a polypropylene composition having excellent foamability in combination with a low volatile content and good balance of mechanical properties can be obtained with a specific polypropylene homopolymer.

Therefore the present invention is directed to a polypropylene composition comprising
a) from 45 to 97.5 wt.-%, based on the total weight of the composition, of a polypropylene homopolymer (H-PP1) having
  i) a melting temperature Tm measured by differential scanning calorimetry (DSC) in the range from 150 to 160° C.,
  ii) a content of 2,1 erythro regiodefects as determined from $^{13}$C-NMR spectroscopy in the range from 0.50 to 1.00 mol.-%,
  iii) an isotactic triad fraction (mm) determined from $^{13}$C-NMR spectroscopy of at least 97.5%, and
  iv) a xylene cold soluble fraction (XCS) determined at 23° C. according ISO 16152 of equal or below 1.5 wt.-%,
b) from 0 to 55 wt.-%, based on the total weight of the composition, of a polypropylene (PP2),
c) from 0 to 30 wt.-%, based on the total weight of the composition, of a filler (F), and
d) from 2.5 to 5 wt.-%, based on the total weight of the composition, of at least one additive selected from the group consisting of colorants, pigments such as carbon black, stabilisers, acid scavengers, nucleating agents, foaming agents, antioxidants and mixtures thereof,
wherein the sum of the amount of the polypropylene homopolymer (H-PP1), the polypropylene (PP2), the filler (F) and the at least one additive in the polypropylene composition is 100.0 wt.-%.

According to one embodiment of the present invention, the composition comprises, preferably consists of, a) from 95 to 97.5 wt.-%, based on the total weight of the composition, of the polypropylene homopolymer (H-PP1), and b) from 2.5 to 5 wt.-%, based on the total weight of the composition, of at least one additive selected from the group consisting of colorants, pigments such as carbon black, stabilisers, acid scavengers, nucleating agents, foaming agents and mixtures thereof.

According to another embodiment of the present invention, the composition comprises, preferably consists of, a) from 45 to 52.5 wt.-%, based on the total weight of the composition, of the polypropylene homopolymer (H-PP1), b) from 45 to 55 wt.-%, based on the total weight of the composition, of a polypropylene (PP2), and c) from 2.5 to 5 wt.-%, based on the total weight of the composition, of at least one additive selected from the group consisting of colorants, pigments such as carbon black, stabilisers, acid scavengers, nucleating agents, foaming agents and mixtures thereof.

According to yet another embodiment of the present invention, the composition has a) a melt flow rate $MFR_2$ (230° C.) measured according to ISO 1133 in the range of 15.0 to 80.0 g/10 min; and/or b) a content of volatile organic compounds no greater than 170 µg/g composition in non-foamed injection moulded parts; and/or c) a content of volatile organic compounds no greater than 200 µg/g composition in pellet form; and/or d) a glass transition temperature Tg (measured with DMTA according to ISO 6721-7) of 0° C. or above, preferably +1° C. or above.

According to one embodiment of the present invention, the composition comprises from 0.1 to 0.5 wt.-%, based on the total weight of the composition, of a nucleating agent, preferably a nucleating agent containing 1,2-cyclohexane dicarboxylic acid.

According to another embodiment of the present invention, the polypropylene (PP2) is a polypropylene homopolymer (H-PP2).

According to yet another embodiment of the present invention, the polypropylene homopolymer (H-PP1) and/or the polypropylene (PP2) has/have a melt flow rate $MFR_2$ (230° C.) measured according to ISO 1133 in the range of 15.0 to 100.0 g/10 min, preferably in the range from 25.0 to 90.0 g/10 min.

According to one embodiment of the present invention, the melt flow rate $MFR_2$ (230° C.) measured according to ISO 1133 of the polypropylene homopolymer (H-PP1) differs from the melt flow rate MFR$_2$ (230° C.) measured according to ISO 1133 of the polypropylene (PP2) by less than 20.0 g/10 min, preferably less than 15.0 g/10 min and most preferably less than 10.0 g/min.

According to another embodiment of the present invention, the polypropylene homopolymer (H-PP1) i) is unimodal, and/or ii) has a molecular weight distribution Mw/Mn measured according to ISO 16014 in the range of ≤4.0, preferably in the range from 2.0 to 4.0, and more preferably in the range from 2.5 to 4.0.

According to yet another embodiment of the present invention, the polypropylene homopolymer (H-PP1) has i) a melting temperature Tm measured by differential scanning calorimetry (DSC) in the range from 150 to 160° C., ii) a content of 2,1 erythro regiodefects as determined from $^{13}$C-NMR spectroscopy in the range from 0.50 to 1.00 mol.-%, iii) an isotactic triad fraction (mm) determined from $^{13}$C-NMR spectroscopy of at least 97.5%, and iv) a xylene cold soluble fraction (XCS) determined at 23° C. according ISO 16152 equal or below 1.5 wt.-%.

According to one embodiment of the present invention, the polypropylene (PP2) has i) a melting temperature Tm measured by differential scanning calorimetry (DSC) in the range from 162 to 170° C., and/or ii) a content of 2,1 erythro regiodefects as determined from $^{13}$C-NMR spectroscopy of ≤0.10 mol.-%, and/or iii) an isotactic triad fraction (mm) determined from $^{13}$C-NMR spectroscopy in the range from 95.0 to 98.0%, and/or iv) a molecular weight distribution Mw/Mn measured according to ISO 16014 in the range of ≥4.0, and/or v) a xylene cold soluble fraction (XCS) determined at 23° C. according ISO 16152 in the range from 1.5 to 3.5 wt.-%.

According to another embodiment of the present invention, the composition has a bimodal molecular structure.

According to yet another embodiment of the present invention, the filler (F) is selected from talcum, mica, wollastonite, glass fibers, carbon fibers and mixtures thereof.

According to another aspect of the present invention, an injection molded article comprising the polypropylene composition as defined herein is provided.

According to a further aspect of the present invention, a foamed article, preferably foamed injection molded article, comprising the polypropylene composition as defined herein is provided.

According to a still further aspect, the use of a polypropylene homopolymer (H-PP1) for reducing the stiffness reduction factor of a foamed injection molded article by at least 40 as determined by the difference of the flexural modulus measured according to ISO 178 of the non-foamed and foamed injection molded article and compared to an article comprising the same amount of a polypropylene which has been polymerized in the presence of a Ziegler-Natta catalyst is provided, wherein the polypropylene homopolymer (H-PP1) has i) a melting temperature Tm measured by differential scanning calorimetry (DSC) in the range from 150 to 160° C., ii) a content of 2,1 erythro regiodefects as determined from $^{13}$C-NMR spectroscopy in the range from 0.50 to 1.00 mol.-%, iii) an isotactic triad fraction (mm) determined from $^{13}$C-NMR spectroscopy of at least 97.5%, and iv) a xylene cold soluble fraction (XCS) determined at 23° C. according ISO 16152 of equal or below 1.5 wt.-%.

In the following the invention is defined in more detail.

The Polypropylene Composition

The polypropylene (PP) composition according to this invention comprises a) from 45 to 97.5 wt.-%, based on the total weight of the composition, of a polypropylene homopolymer (H-PP1) having
  i) a melting temperature Tm measured by differential scanning calorimetry (DSC) in the range from 150 to 160° C.,
  ii) a content of 2,1 erythro regiodefects as determined from $^{13}$C-NMR spectroscopy in the range from 0.50 to 1.00 mol.-%,
  iii) an isotactic triad fraction (mm) determined from $^{13}$C-NMR spectroscopy of at least 97.5%, and
  iv) a xylene cold soluble fraction (XCS) determined at 23° C. according ISO 16152 of equal or below 1.5 wt.-%,
b) from 0 to 55 wt.-%, based on the total weight of the composition, of a polypropylene (PP2),
c) from 0 to 30 wt.-%, based on the total weight of the composition, of a filler (F), and
d) from 2.5 to 5 wt.-%, based on the total weight of the composition, of at least one additive selected from the group consisting of colorants, pigments such as carbon black, stabilisers, acid scavengers, nucleating agents, foaming agents, antioxidants and mixtures thereof,
wherein the sum of the amount of the polypropylene homopolymer (H-PP1), the polypropylene (PP2), the filler (F) and the at least one additive in the polypropylene composition is 100.0 wt.-%.

In a preferred embodiment, the polypropylene composition according to this invention does not comprise (a) further polymer(s) different to the polymer present in the polypropylene (PP) composition, i.e. different to the polypropylene homopolymer (H-PP1) and the optional polypropylene (PP2). Typically, if an additional polymer is present, such a polymer is a carrier polymer for additives and thus does not contribute to the improved properties of the claimed polypropylene composition.

Accordingly in one embodiment the polypropylene composition consists of the polypropylene homopolymer (H-PP1), the optional polypropylene (PP2), the optional filler (F) and the at least one additive, which might contain low amounts of polymeric carrier material. However, this polymeric carrier material is not more than 2.0 wt.-%, preferably not more than 1.6 wt.-%, based on the total weight of the polypropylene composition, present in said polypropylene composition.

In one embodiment, it is thus preferred that the polypropylene composition consists of a) from 45 to 97.5 wt.-%, based on the total weight of the composition, of a polypropylene homopolymer (H-PP1) having
  i) a melting temperature Tm measured by differential scanning calorimetry (DSC) in the range from 150 to 160° C.,
  ii) a content of 2,1 erythro regiodefects as determined from $^{13}$C-NMR spectroscopy in the range from 0.50 to 1.00 mol.-%,
  iii) an isotactic triad fraction (mm) determined from $^{13}$C-NMR spectroscopy of at least 97.5%, and
  iv) a xylene cold soluble fraction (XCS) determined at 23° C. according ISO 16152 of equal or below 1.5 wt.-%,
b) from 0 to 55 wt.-%, based on the total weight of the composition, of a polypropylene (PP2),
c) from 0 to 30 wt.-%, based on the total weight of the composition, of a filler (F), and
d) from 2.5 to 5 wt.-%, based on the total weight of the composition, of at least one additive selected from the group consisting of colorants, pigments such as carbon black, stabilisers, acid scavengers, nucleating agents, foaming agents, antioxidants and mixtures thereof,
wherein the sum of the amount of the polypropylene homopolymer (H-PP1), the polypropylene (PP2), the filler (F) and the at least one additive in the polypropylene composition is 100.0 wt.-%.

Preferably, the polypropylene composition comprises, more preferably consists of,
a) from 95 to 97.5 wt.-%, based on the total weight of the composition, of the polypropylene homopolymer (H-PP1), and
b) from 2.5 to 5 wt.-%, based on the total weight of the composition, of at least one additive selected from the group consisting of colorants, pigments such as carbon black, stabilisers, acid scavengers, nucleating agents, foaming agents and mixtures thereof.

In an alternative embodiment, the polypropylene composition comprises, preferably consists of,
a) from 45 to 52.5 wt.-%, based on the total weight of the composition, of the polypropylene homopolymer (H-PP1),
b) from 45 to 55 wt.-%, based on the total weight of the composition, of a polypropylene (PP2), and
c) from 2.5 to 5 wt.-%, based on the total weight of the composition, of at least one additive selected from the group consisting of colorants, pigments such as carbon black, stabilisers, acid scavengers, nucleating agents, foaming agents and mixtures thereof.

In another embodiment, the polypropylene composition comprises, preferably consists of,
a) from 45 to 80.5 wt.-%, based on the total weight of the composition, of the polypropylene homopolymer (H-PP1),
b) from 15 to 30 wt.-%, based on the total weight of the composition, of a polypropylene (PP2),
c) from 2 to 20 wt.-%, based on the total weight of the composition, of a filler (F), and
d) from 2.5 to 5 wt.-%, based on the total weight of the composition, of at least one additive selected from the group consisting of colorants, pigments such as carbon black, stabilisers, acid scavengers, nucleating agents, foaming agents and mixtures thereof.

Preferably the polypropylene composition has a melt flow rate $MFR_2$ (230° C., 2.16 kg) measured according to ISO 1133 in the range from 15.0 to 80.0 g/10 min, more preferably in the range from 25.0 to 80 g/10 min, like in the range from 40.0 to 74.0 g/10 min.

Additionally or alternatively, the polypropylene composition has a content of volatile organic compounds no greater than 200 µg/g composition in pellet form, preferably no greater than 180 µg/g composition in pellet form and most preferably no greater than 165 µg/g composition in pellet form.

Additionally or alternatively, the polypropylene composition has a content of volatile organic compounds no greater than 170 µg/g composition in non-foamed injection moulded parts, preferably no greater than 120 µg/g composition in non-foamed injection moulded parts and most preferably no greater than 90 µg/g composition in non-foamed injection moulded parts.

Additionally or alternatively, the polypropylene composition has a glass transition temperature Tg (measured with DMTA according to ISO 6721-7) of 0° C. or above, preferably +1° C. or above and most preferably in the range from +1 to +10° C.

In a preferred embodiment, the polypropylene composition has
a) a melt flow rate $MFR_2$ (230° C., 2.16 kg) measured according to ISO 1133 in the range from 15.0 to 80.0 g/10 min, more preferably in the range from 25.0 to 80 g/10 min, like in the range from 40.0 to 74.0 g/10 min, and/or
b) a content of volatile organic compounds no greater than 170 µg/g composition in non-foamed injection moulded parts, preferably no greater than 120 µg/g composition in non-foamed injection moulded parts and most preferably no greater than 90 µg/g composition in non-foamed injection moulded parts, and/or
c) a content of volatile organic compounds no greater than 200 µg/g composition in pellet form, preferably no greater than 180 µg/g composition in pellet form and most preferably no greater than 165 µg/g composition in pellet form, and/or
d) a glass transition temperature Tg (measured with DMTA according to ISO 6721-7) of 0° C. or above, preferably +1° C. or above and most preferably in the range from +1 to +10° C.

For example, the polypropylene (PP) composition has
a) a melt flow rate $MFR_2$ (230° C., 2.16 kg) measured according to ISO 1133 in the range from 15.0 to 80.0 g/10 min, more preferably in the range from 25.0 to 80 g/10 min, like in the range from 40.0 to 74.0 g/10 min, or
b) a content of volatile organic compounds no greater than 170 µg/g composition in non-foamed injection moulded parts, preferably no greater than 120 µg/g composition in non-foamed injection moulded parts and most preferably no greater than 90 µg/g composition in non-foamed injection moulded parts, or
c) a content of volatile organic compounds no greater than 200 µg/g composition in pellet form, preferably no greater than 180 µg/g composition in pellet form and most preferably no greater than 165 µg/g composition in pellet form, or
d) a glass transition temperature Tg (measured with DMTA according to ISO 6721-7) of 0° C. or above, preferably +1° C. or above and most preferably in the range from +1 to +10° C.

For example, the polypropylene (PP) composition has
a) a melt flow rate $MFR_2$ (230° C., 2.16 kg) measured according to ISO 1133 in the range from 15.0 to 80.0 g/10 min, more preferably in the range from 25.0 to 80 g/10 min, like in the range from 40.0 to 74.0 g/10 min, and
b) a content of volatile organic compounds no greater than 170 µg/g composition in non-foamed injection moulded parts, preferably no greater than 120 µg/g composition in non-foamed injection moulded parts and most preferably no greater than 90 µg/g composition in non-foamed injection moulded parts, and
c) a content of volatile organic compounds no greater than 200 µg/g composition in pellet form, preferably no greater than 180 µg/g composition in pellet form and most preferably no greater than 165 µg/g composition in pellet form, and
d) a glass transition temperature Tg (measured with DMTA according to ISO 6721-7) of 0° C. or above, preferably +1° C. or above and most preferably in the range from +1 to +10° C.

It is preferred that the polypropylene composition can be unimodal or multimodal, like bimodal. However, it is preferred that the polypropylene composition has a bimodal molecular structure.

It is appreciated that the polypropylene composition imparts an advantageous stiffness reduction factor to foamed injection molded articles. Thus, it is preferred that the stiffness reduction factor of a foamed injection molded article is reduced by at least 40 as determined by the difference of the flexural modulus measured according to ISO 178 of the non-foamed and foamed injection molded article and compared to an article comprising the same amount of a polypropylene which has been polymerized in the presence of a Ziegler-Natta catalyst.

The polypropylene composition according to the invention may be compounded and pelletized using any of the variety of compounding and blending machines and methods well known and commonly used in the resin compounding art.

For blending the individual components of the instant polypropylene composition a conventional compounding or blending apparatus, e.g. a Banbury mixer, a 2-roll rubber mill, Buss-co-kneader or a twin screw extruder may be used. The polypropylene compositions recovered from the extruder/mixer are usually in the form of pellets. These pellets are then preferably further processed, e.g. by injection molding to generate articles and products of the inventive composition.

In the following, the individual components of the polypropylene composition are described in more detail.

The Polypropylene Homopolymer (H-PP1)

The polypropylene composition must comprise a polypropylene homopolymer (H-PP1) in amounts from 45 to 97.5 wt.-%, based on the total weight of the polypropylene composition. Preferably, the polypropylene composition comprises the polypropylene homopolymer (H-PP1) in amounts from 80 to 97.5 wt.-%, like in the range of 95 to 97.5 wt.-%, based on the total weight of the polypropylene composition.

It is preferred that the polypropylene homopolymer (H-PP1) has a melt flow rate $MFR_2$ (230° C., 2.16 kg) measured according to ISO 1133 in the range from 15.0 to 100.0 g/10 min, more preferably in the range from 25.0 to 90.0 g/10 min.

The polypropylene homopolymer (H-PP1) can be unimodal or multimodal, like bimodal. However, it is preferred that polypropylene homopolymer (H-PP1) is unimodal.

The expressions "unimodal", "bimodal" and "multimodal" as used herein refer to the modality of the polymer, i.e. the form of its molecular weight distribution curve, which is the graph of the molecular weight fraction as a function of its molecular weight.

When the polypropylene homopolymer (H-PP1) is unimodal with respect to the molecular weight distribution, it may be prepared in a single stage process e.g. as slurry or gas phase process in a slurry or gas phase reactor. Preferably, the unimodal polypropylene homopolymer (H-PP1) is polymerized in a slurry polymerization. Alternatively, the unimodal polypropylene homopolymer (H-PP1) may be produced in a multistage process using at each stage process conditions which result in similar polymer properties.

The term "polypropylene homopolymer (H-PP1)" used in the present invention relates to a polypropylene that consists substantially, i.e. of more than 98.0 wt.-% of, preferably of more than 99.0 wt.-%, even more preferably of more than 99.5 wt.-%, still more preferably of at least 99.8 wt.-%, of propylene units. In a preferred embodiment, only propylene units in the polypropylene homopolymer (H-PP1) are detectable.

It is appreciated that the polypropylene homopolymer (H-PP1) has a xylene cold soluble (XCS) content of equal or below 1.5 wt.-%, based on the total weight of the polypropylene homopolymer (H-PP1). For example, the polypropylene homopolymer (H-PP1) has a xylene cold soluble (XCS) content in the range from 0.1 to 1.5 wt.-%, preferably in the range from 0.1 to 1.4 wt.-%, based on the total weight of the polypropylene homopolymer (H-PP1).

It is a further requirement of the present invention that the polypropylene homopolymer (H-PP1) has a relatively high melting temperature $T_m$. More precisely, it is required that the polypropylene homopolymer (H-PP1) has a melting temperature $T_m$ measured by differential scanning calorimetry (DSC) in the range from 150 to 160° C. For example, the polypropylene homopolymer (H-PP1) has a melting temperature $T_m$ measured by differential scanning calorimetry (DSC) in the range from 152 to 158° C., preferably in the range from 152 to 156° C.

The relatively high melting temperature $T_m$ indicates that the polypropylene homopolymer (H-PP1) has a rather low content of regiodefects. It is preferred that the polypropylene homopolymer (H-PP1) has a content of 2,1 erythro regiodefects as determined from $^{13}$C-NMR spectroscopy in the range from 0.50 to 1.00 mol.-%. More preferably, the polypropylene homopolymer (H-PP1) has 2,1 erythro regiodefects in the range from 0.55 to 0.80 mol.-% and most preferably in the range from 0.60 to 0.80 mol.-%, determined by $^{13}$C-NMR spectroscopy.

Additionally or alternatively, the polypropylene homopolymer (H-PP1) has an isotactic triad fraction (mm) determined from $^{13}$C-NMR spectroscopy of at least 97.5%. For example, the polypropylene homopolymer (H-PP1) has an isotactic triad fraction (mm) determined from $^{13}$C-NMR spectroscopy of at least 98.5%, more preferably of at least 99.0%, like in the range from 99.0 to 99.5%.

It is thus one requirement that the polypropylene homopolymer (H-PP1) has
 i) a melting temperature Tm measured by differential scanning calorimetry (DSC) in the range from 150 to 160° C., preferably in the range from 152 to 158° C., and most preferably in the range from 152 to 156° C.,
 ii) a content of 2,1 erythro regiodefects as determined from $^{13}$C-NMR spectroscopy in the range from 0.50 to 1.00 mol.-%, preferably in the range from 0.55 to 0.80 mol.-% and most preferably in the range from 0.60 to 0.80 mol.-%,
 iii) an isotactic triad fraction (mm) determined from $^{13}$C-NMR spectroscopy of at least 97.5%, preferably of at least 98.5%, more preferably of at least 99.0%, like in the range from 99.0 to 99.5%, and
 iv) a xylene cold soluble fraction (XCS) determined at 23° C. according ISO 16152 of equal or below 1.5 wt.-%, preferably in the range from 0.1 to 1.5 wt.-%, and most preferably in the range from 0.1 to 1.4 wt.-%.

It is preferred that the polypropylene homopolymer (H-PP1) has a weight average molecular weight (Mw) in the range from 80 to 500 kg/mol, preferably in the range from 100 to 400 kg/mol, more preferably in the range from 120 to 350 k/mol, and/or a number average molecular weight (Mn) of 20 to 200 kg/mol, more preferably 50 to 150 kg/mol, determined by GPC according to ISO 16014.

It is preferred that the polypropylene homopolymer (H-PP1) has a molecular weight distribution Mw/Mn measured according to ISO 16014 of ≤4.0, preferably in the range from 1.5 to 4.0, more preferably in the range from 2.0 to 4.0, and most preferably in the range from 2.5 to 4.0.

Thus, in one embodiment the polypropylene homopolymer (H-PP1)
i) is unimodal, and/or
ii) has a molecular weight distribution Mw/Mn measured according to ISO 16014 in the range of ≤4.0, preferably in the range from 2.0 to 4.0, and more preferably in the range from 2.5 to 4.0.

For example, the polypropylene homopolymer (H-PP1)
i) is unimodal, or
ii) has a molecular weight distribution Mw/Mn measured according to ISO 16014 in the range of ≤4.0, preferably in the range from 2.0 to 4.0, and more preferably in the range from 2.5 to 4.0.

Alternatively, the polypropylene homopolymer (H-PP1) has
i) is unimodal, and
ii) has a molecular weight distribution Mw/Mn measured according to ISO 16014 in the range of ≤4.0, preferably in the range from 2.0 to 4.0, and more preferably in the range from 2.5 to 4.0.

The polypropylene homopolymer (H-PP1) is preferably produced by a single- or multistage process polymerization of propylene such as bulk polymerization, gas phase polymerization, slurry polymerization, solution polymerization or combinations thereof. The polypropylene homopolymer (H-PP1) can be made either in loop reactors or in a combination of loop and gas phase reactor. Those processes are well known to one skilled in the art.

In order to overcome the drawbacks of the prior art, it is appreciated that the polypropylene homopolymer (H-PP1) must be polymerized in the presence of a single-site catalyst.

It is preferred that the catalyst system includes a catalyst component according to formula (I)

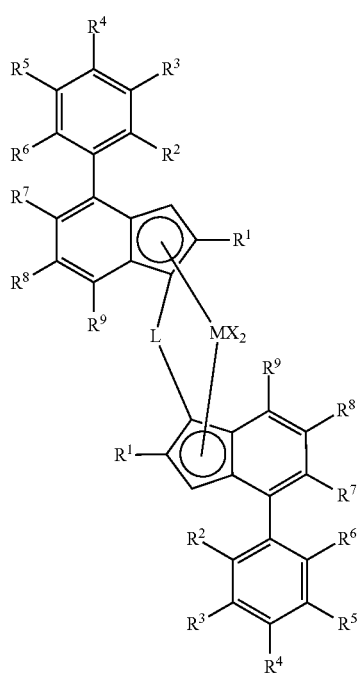

(I)

wherein
M is zirconium or hafnium;
each X independently is a sigma-donor ligand
L is a bridge of formula -$(ER^{10}_2)_y$—;
y is 1 or 2;
E is C or Si;
each $R^{10}$ is independently a $C_1$-$C_{20}$-hydrocarbyl group, tri($C_1$-$C_{20}$ alkyl)silyl group, $C_6$-$C_{20}$ aryl group, $C_7$-$C_{20}$ arylalkyl group or $C_7$-$C_{20}$ alkylaryl group or L is an alkylene group such as methylene or ethylene;
$R^1$ are each independently the same or are different from each other and are a $CH_2$—$R^{11}$ group, with $R^{11}$ being H or linear or branched $C_1$-$C_6$ alkyl group, $C_3$-$C_8$ cycloalkyl group, $C_6$-$C_{10}$ aryl group;
$R^3$, $R^4$ and $R^5$ are each independently the same or different from each other and are H or a linear or branched $C_1$-$C_6$ alkyl group, $C_7$-$C_{20}$ arylalkyl group, $C_7$-$C_{20}$ alkylaryl group, or $C_6$-$C_{20}$ aryl group with the proviso that if there are four or more $R^3$, $R^4$ and $R^5$ groups different from H present in total, one or more of $R^3$, $R^4$ and $R^5$ is other than tert butyl;
$R^7$ and $R^8$ are each independently the same or different from each other and are H, a $CH_2$—$R^{12}$ group, with $R^{12}$ being H or linear or branched $C_1$-$C_6$ alkyl group, $SiR^{13}_3$, $GeR^{13}_3$, $OR^{13}$, $SR^{13}$, $NR^{13}_2$,
wherein
$R^{13}$ is a linear or branched $C_1$-$C_6$ alkyl group, $C_7$-$C_{20}$ alkylaryl group and $C_7$-$C_{20}$ arylalkyl group or $C_6$-$C_{20}$ aryl group.

The catalyst system may include also
(ii) a cocatalyst system comprising a boron containing cocatalyst and an aluminoxane cocatalyst;

It should be stressed that, in some instances the use of such cocatalyst may not be required. The catalyst system of the invention can be used in non-supported form or in solid form. The catalyst system of the invention may be used as a homogeneous catalyst system or heterogeneous catalyst system.

The catalyst system of the invention in solid form, preferably in solid particulate form can be either supported on an external carrier material, like silica or alumina, or, in a particularly preferred embodiment, is free from an external carrier, however still being in solid form. For example, the solid catalyst system is obtainable by a process in which
(a) a liquid/liquid emulsion system is formed, said liquid/liquid emulsion system comprising a solution of the catalyst components (i) and (ii) dispersed in a solvent so as to form dispersed droplets; and
(b) solid particles are formed by solidifying said dispersed droplets.

Particular complexes of the invention include:
Rac-anti-dimethylsilanediyl[2-methyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-iso-butyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-neo-pentyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-benzyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl, Rac-anti-dimethylsilanediyl[2-cyclohexylmethyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl, Race-anti-dimethylsilanediyl[2-methyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, Rac-anti-dimethylsilanediyl[2-iso-butyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, Rac-anti-dimethylsilanediyl[2-neo-pentyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, Rac-anti-dimethylsilanediyl[2-benzyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, and Rac-anti-dimethylsilanediyl[2-cyclohexylmethyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl.

The catalysts have been described inter alia in WO2015/011135 which is incorporated by reference herewith. A particularly preferred catalyst is catalyst number 3 of WO2015/011135. The preparation of the metallocenes has been described in WO2013/007650 which is incorporated by reference herewith. The complex preparation of the particular preferred catalyst has been described as E2 in WO2013/007650.

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

The ligands required to form the complexes and hence catalysts/catalyst system of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780 and WO2015/158790. The examples section also provides the skilled person with sufficient direction.

As stated above a cocatalyst is not always required. However, when used, the cocatalyst system comprises a boron containing cocatalyst as well as an aluminoxane cocatalyst.

The aluminoxane cocatalyst can be one of formula (II):

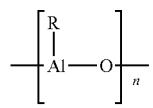

(II)

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_3$-$C_{10}$-cycloalkyl, $C_7$-$C_{12}$-arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers of the formula (II).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention the aluminoxane cocatalyst is used in combination with a boron containing cocatalyst, i.e. when a cocatalyst system or a cocatalyst is present, which is usually not required.

Boron based cocatalysts of interest include those of formula (III)

wherein Y independently is the same or can be different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl)phenyl. Preferred options are trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris(3,5-dimethyl-phenyl)borane, tris(3,5-difluorophenyl)borane and/or tris (3,4,5-trifluorophenyl)borane.

Particular preference is given to tris(pentafluorophenyl) borane.

Borates can be used, i.e. compounds containing a borate 3+ ion. Such ionic cocatalysts preferably contain a non-coordinating anion such as tetrakis(pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:
triethylammoniumtetra(phenyl)borate,
tributylammoniumtetra(phenyl)borate,
trimethylammoniumtetra(tolyl)borate,
tributylammoniumtetra(tolyl)borate,
tributylammoniumtetra(pentafluorophenyl)borate,
tripropylammoniumtetra(dimethylphenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl)borate,
N,N-dimethylaniliniumtetra(phenyl)borate, N,N-diethylaniliniumtetra(phenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate,
tri(dimethylphenyl)phosphoniumtetrakis(phenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate or N,N-dimethylbenzylammoniumtetrakis(pentafluorophenyl)borate.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO94/14856 (Mobil), WO95/12622 (Borealis) and WO2006/097497. The particle size is not critical but is preferably in the range 5 to 200 µm, more preferably 20 to 80 µm. The use of these supports is routine in the art.

In an alternative embodiment, no support is used at all. Such a catalyst system can be prepared in solution, for example in an aromatic solvent like toluene, by contacting the metallocene (as a solid or as a solution) with the cocatalyst, for example methylaluminoxane previously dissolved in an aromatic solvent, or can be prepared by sequentially adding the dissolved catalyst components to the polymerization medium.

In one particularly preferred embodiment, no external carrier is used but the catalyst is still presented in solid particulate form. Thus, no external support material, such as inert organic or inorganic carrier, for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent. In a preferred method for forming the catalyst at least two separate solutions for each or part of said catalyst may be prepared, which are then dispersed successively to the immiscible solvent.

More preferably, a solution of the complex comprising the transition metal compound and the cocatalyst is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e. g. temperatures) used during the dispersing step.

The term "immiscible with the catalyst solution" means that the solvent (continuous phase) is fully immiscible or partly immiscible i.e. not fully miscible with the dispersed phase solution.

Preferably, said solvent is inert in relation to the compounds of the catalyst system to be produced. Full disclosure of the necessary process can be found in WO03/051934.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934. Preferably solidification is caused by an external stimulus to the emulsion system such as a temperature change to cause the solidification. Thus in said step the catalyst component(s) remain "fixed" within the formed solid particles. It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with a uniform particle size distribution can be obtained.

The process is also industrially advantageous, since it enables the preparation of the solid particles to be carried out as a one-pot procedure. Continuous or semicontinuous processes are also possible for producing the catalyst.

In the polymerization process according to the present invention fresh catalyst is preferably only introduced into the first reactor or, if present, into the prepolymerization reactor or vessel, i.e. no fresh catalyst is introduced into the second reactor or any further reactor being present upstream of the first reactor or upstream of the prepolymerization vessel. Fresh catalyst denotes the virgin catalyst species or the virgin catalyst species subjected to a prepolymerization.

The Polypropylene (PP2)

The polypropylene composition may comprise a polypropylene (PP2) in amounts ranging from 0 to 55 wt.-%, based on the total weight of the polypropylene composition.

In one embodiment, the polypropylene homopolymer (H-PP1) is the only polymeric component in the polypropylene composition. That is to say, the polypropylene composition is free of the polypropylene (PP2).

In an alternative embodiment, the polypropylene composition comprises the polypropylene (PP2). In this case, it is preferred that the polypropylene composition has a bimodal molecular structure.

If present, the polypropylene composition comprises the polypropylene (PP2) preferably in amounts from 30 to 55 wt.-%, like in the range of 45 to 55 wt.-%, based on the total weight of the polypropylene composition.

In the present invention, the term "polypropylene (PP2)" encompasses polypropylene homopolymers and/or polypropylene copolymers.

Moreover, the term "propylene copolymer" encompasses polypropylene random copolymers, heterophasic polymers and mixtures thereof.

As known for the skilled person, random polypropylene copolymer is different from heterophasic polypropylene which is a propylene copolymer comprising a propylene homo or random copolymer matrix component (1) and an elastomeric copolymer component (2) of propylene with one or more of ethylene and $C_4$-$C_8$ alpha-olefin copolymers, wherein the elastomeric (amorphous) copolymer component (2) is dispersed in said propylene homo or random copolymer matrix polymer (1).

In one embodiment of the present invention, the polypropylene (PP2) being present in the polypropylene composition is a polypropylene homopolymer (H-PP2) and/or a polypropylene copolymer (C-PP2). For example, the polypropylene composition comprises a polypropylene homopolymer (H-PP2) or a polypropylene copolymer (C-PP2).

In one specific embodiment, the polypropylene composition comprises a polypropylene homopolymer (H-PP2) as the polypropylene (PP2).

The term "polypropylene homopolymer (H-PP2)" used in the present invention relates to a polypropylene that consists substantially, i.e. of more than 98.0 wt.-% of, preferably of more than 99.0 wt.-%, even more preferably of more than 99.5 wt.-%, still more preferably of at least 99.8 wt.-%, of propylene units. In a preferred embodiment, only propylene units in the polypropylene homopolymer (H-PP2) are detectable.

It is preferred that the polypropylene (PP2), preferably the polypropylene homopolymer (H-PP2), has a melt flow rate $MFR_2$ (230° C., 2.16 kg) measured according to ISO 1133 in the range from 15.0 to 100.0 g/10 min, more preferably in the range from 25.0 to 90.0 g/10 min.

It is appreciated that the melt flow rate $MFR_2$ (230° C.) measured according to ISO 1133 of the polypropylene homopolymer (H-PP1) differs from the melt flow rate $MFR_2$ (230° C.) measured according to ISO 1133 of the polypropylene (PP2), preferably the polypropylene homopolymer (H-PP2), by less than 20.0 g/10 min, preferably less than 15.0 g/10 min and most preferably less than 10.0 g/min. For example, the melt flow rate $MFR_2$ (230° C.) measured according to ISO 1133 of the polypropylene homopolymer (H-PP1) differs from the melt flow rate $MFR_2$ (230° C.) measured according to ISO 1133 of the polypropylene (PP2), preferably the polypropylene homopolymer (H-PP2), by 1.0 to 10.0 g/min.

The polypropylene (PP2), preferably the polypropylene homopolymer (H-PP2), can be unimodal or multimodal, like bimodal. However, it is preferred that polypropylene (PP2), preferably the polypropylene homopolymer (H-PP2), is unimodal.

The expression "unimodal", "bimodal" and "multimodal" as used herein refers to the modality of the polymer, i.e. the form of its molecular weight distribution curve, which is the graph of the molecular weight fraction as a function of its molecular weight.

It is appreciated that the polypropylene (PP2), preferably the polypropylene homopolymer (H-PP2), has a xylene cold soluble (XCS) content in the range from 1.5 to 3.5 wt.-%, preferably in the range from 1.5 to 3.0 wt.-%, based on the total weight of the polypropylene (PP2), preferably the polypropylene homopolymer (H-PP2).

It is further preferred that the polypropylene (PP2), preferably the polypropylene homopolymer (H-PP2), has a relatively high melting temperature $T_m$. More precisely, it is preferred that the polypropylene (PP2), preferably the polypropylene homopolymer (H-PP2), has a melting temperature $T_m$ that is above the melting temperature of the polypropylene homopolymer (H-PP1). For example, the polypropylene (PP2), preferably the polypropylene homopolymer (H-PP2), has a melting temperature $T_m$ measured by differential scanning calorimetry (DSC) in the range from 162 to 170° C., preferably in the range from 162 to 168° C.

The relatively high melting temperature $T_m$ indicates that the polypropylene (PP2), preferably the polypropylene homopolymer (H-PP2), has a rather low content of regio-defects. It is preferred that the polypropylene (PP2), preferably the polypropylene homopolymer (H-PP2), has a content of 2,1 erythro regiodefects as determined from $^{13}$C-NMR spectroscopy of ≤0.10 mol.-%, preferably of 0.0 mol.-%. As well-known in the art, polypropylenes having such an amount of 2,1-erythro regiodefects are preferably produced with a Ziegler-Natta catalyst. Accordingly, the polypropylene (PP2), preferably the polypropylene homopolymer (H-PP2), is preferably produced with a Ziegler-Natta catalyst.

Additionally or alternatively, the polypropylene (PP2), preferably the polypropylene homopolymer (H-PP2), has an isotactic triad fraction (mm) determined from $^{13}$C-NMR spectroscopy in the range from 95.0 to 98.0%.

It is preferred that the polypropylene (PP2), preferably the polypropylene homopolymer (H-PP2), has a weight average molecular weight (Mw) in the range from 80 to 500 kg/mol, preferably in the range from 100 to 400 kg/mol, more preferably in the range from 120 to 350 k/mol, and/or a number average molecular weight (Mn) of 20 to 200 kg/mol, more preferably 50 to 150 kg/mol, determined by GPC according to ISO 16014.

It is preferred that the polypropylene (PP2), preferably the polypropylene homopolymer (H-PP2), has a molecular weight distribution Mw/Mn measured according to ISO 16014 of ≥4.0, preferably in the range from 4.0 to 8.0, and most preferably in the range from 4.0 to 7.0.

Additionally or alternatively, the polypropylene (PP2), preferably the polypropylene homopolymer (H-PP2), has a density in the range from 0.900 to 0.910 g/cm$^3$.

Thus, in one embodiment the polypropylene (PP2), preferably the polypropylene homopolymer (H-PP2), has
i) a melting temperature Tm measured by differential scanning calorimetry (DSC) in the range from 162 to 170° C., preferably in the range from 162 to 168° C., and/or
ii) a content of 2,1 erythro regiodefects as determined from $^{13}$C-NMR spectroscopy of ≤0.10 mol.-%, and/or
iii) an isotactic triad fraction (mm) determined from $^{13}$C-NMR spectroscopy in the range from 95.0 to 98.0%, and/or
iv) a molecular weight distribution Mw/Mn measured according to ISO 16014 in the range of ≥4.0, preferably in the range from 4.0 to 8.0, and most preferably in the range from 4.0 to 7.0, and/or
v) a xylene cold soluble fraction (XCS) determined at 23° C. according ISO 16152 in the range from 1.5 to 3.5 wt.-%, preferably in the range from 1.5 to 3.0 wt.-%.

For example, the polypropylene (PP2), preferably the polypropylene homopolymer (H-PP2), has
i) a melting temperature Tm measured by differential scanning calorimetry (DSC) in the range from 162 to 170° C., preferably in the range from 162 to 168° C., or
ii) a content of 2,1 erythro regiodefects as determined from $^{13}$C-NMR spectroscopy of ≤0.10 mol.-%, or
iii) an isotactic triad fraction (mm) determined from $^{13}$C-NMR spectroscopy in the range from 95.0 to 98.0%, or
iv) a molecular weight distribution Mw/Mn measured according to ISO 16014 in the range of ≥4.0, preferably in the range from 4.0 to 8.0, and most preferably in the range from 4.0 to 7.0, or
v) a xylene cold soluble fraction (XCS) determined at 23° C. according ISO 16152 in the range from 1.5 to 3.5 wt.-%, preferably in the range from 1.5 to 3.0 wt.-%.

Alternatively, the polypropylene (PP2), preferably the polypropylene homopolymer (H-PP2), has
i) a melting temperature Tm measured by differential scanning calorimetry (DSC) in the range from 162 to 170° C., preferably in the range from 162 to 168° C., and
ii) a content of 2,1 erythro regiodefects as determined from $^{13}$C-NMR spectroscopy of ≤0.10 mol.-%, and
iii) an isotactic triad fraction (mm) determined from $^{13}$C-NMR spectroscopy in the range from 95.0 to 98.0%, and
iv) a molecular weight distribution Mw/Mn measured according to ISO 16014 in the range of ≥4.0, preferably in the range from 4.0 to 8.0, and most preferably in the range from 4.0 to 7.0, and
v) a xylene cold soluble fraction (XCS) determined at 23° C. according ISO 16152 in the range from 1.5 to 3.5 wt.-%, preferably in the range from 1.5 to 3.0 wt.-%.

The polypropylene (PP2), preferably the polypropylene homopolymer (H-PP2), is preferably produced by a single- or multistage process polymerization of propylene such as bulk polymerization, gas phase polymerization, slurry polymerization, solution polymerization or combinations thereof. The polypropylene (PP2), preferably the polypropylene homopolymer (H-PP2), can be made either in loop reactors or in a combination of loop and gas phase reactor. Those processes are well known to one skilled in the art.

In order to overcome the drawbacks of the prior art, it is appreciated that the polypropylene (PP2), preferably the polypropylene homopolymer (H-PP2), is preferably polymerized in the presence of a Ziegler-Natta catalyst, which are known to those skilled in the art.

The Filler (F)

In addition, the polypropylene composition according to the present invention may comprises a filler (F) in amounts from 0 to 30.0 wt.-%, based on the total weight of the polypropylene composition.

Preferably, the polypropylene composition comprises the filler (F) in amounts from 2 to 20 wt.-%, like in the range of 3 to 15 wt.-%, based on the total weight of the polypropylene composition.

In one specific embodiment, the polypropylene composition is free of a filler (F).

Preferably, the filler (F) is a mineral filler (F).

If present, the filler (F) is preferably selected from talcum, mica, wollastonite, glass fibers, carbon fibers and mixtures thereof.

In general, the filler (F) may have a particle size $d_{50}$ in the range from 5 to 30 µm, preferably in the range from 5 to 25 µm, more preferably in the range from 5 to 20 µm.

A preferred filler (F) is talc. Preferably talc having a particle size $d_{50}$ in the range from 0.1 to 10 µm, preferably in the range from 0.2 to 6.0 µm, more preferably in the range from 0.3 to 4.0 µm is used as filler (F). Most preferably talc is used as the sole filler (F). Still more preferably the talc used has a top-cut particle size (95% of particles below that size, according to ISO 787-7) of 0.8 to 50 µm, preferably from 1.0 to 25 µm and most preferably from 1.2 to 20 µm.

The at Least One Additive

It is required that the polypropylene composition comprises at least one additive in an amount ranging from 2.5 to 5 wt.-%, based on the total weight of the composition. The at least one additive is selected from the group consisting of colorants, pigments such as carbon black, stabilisers, acid scavengers, nucleating agents, foaming agents, antioxidants and mixtures thereof.

It is to be noted that the term "at least one" additive in the meaning of the present invention means that the additive comprises one or more additives(s). In one embodiment, the additive is thus one additive. Alternatively, the additive comprises two or more, such as two or three, additives.

Preferably, the additive comprises two or more, such as two or three, additives.

The term "additive" covers also additives which are provided as a masterbatch containing the polymeric carrier material as discussed above.

It is appreciated that the polypropylene composition preferably comprises a nucleating agent. Thus, it is preferred that the polypropylene composition comprises a nucleating agent and one or more further additives selected from colorants, pigments such as carbon black, stabilisers, acid scavengers, foaming agents, antioxidants and mixtures thereof.

For example, the polypropylene composition contains preferably a nucleating agent, more preferably an α-nucleating agent. Even more preferred the polypropylene composition according to the present invention is free of β-nucleating agents. Accordingly, the nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, and (iii) salts of diesters of phosphoric acid, e.g. sodium 2,2'-methylenebis (4, 6-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer, and
(v) mixtures thereof.

Preferably, the α-nucleating agent is a nucleating agent containing 1,2-cyclohexane dicarboxylic acid. For example, commercially available α-nucleating agents, which can be used for the composition of the invention are, for example, Irgaclear XT 386 (N-[3,5-bis-(2,2-dimethyl-propionylamino)-phenyl]-2,2-dimethylpropionamide) from Ciba Speciality Chemicals, Hyperform HPN-68L and Hyperform HPN-20E from Milliken & Company.

In one embodiment, the polypropylene composition comprises from 0.1 to 0.5 wt.-%, based on the total weight of the composition, of the nucleating agent. Preferably, the polypropylene composition comprises from 0.1 to 0.5 wt.-%, based on the total weight of the composition, of a nucleating agent containing 1,2-cyclohexane dicarboxylic acid.

Additionally or alternatively, the polypropylene composition comprises (a) foaming agent(s).

Throughout the present invention, the term "foaming agent" refers to an agent which is capable of producing a cellular structure in a polypropylene composition during foaming. Suitable foaming agents comprise e.g. bicarbonates, preferably bicarbonates and polyolefin carrier. Such foaming agents are commercially available, from e.g. EIWA CHEMICAL IND. CO., LTD.

The polypropylene composition of the present invention comprises the foaming agent preferably in an amount of less than 10 wt.-%, more preferably from 1 wt.-% to 7 wt.-% and most preferably from 1.5 wt.-% to 3 wt.-%, based on the total weight of the polypropylene composition.

Generally, such additives are commercially available and are described, for example, in "Plastic Additives Handbook", 5th edition, 2001 of Hans Zweifel.

In one preferred embodiment, the polypropylene composition comprises (a) nucleating agent(s) and (a) foaming agent(s) and optionally at least one additive selected from colorants, pigments such as carbon black, stabilisers, acid scavengers, antioxidants and mixtures thereof.

Preferably, the polypropylene composition comprises (a) nucleating agent(s) and (a) foaming agent(s) and at least one additive selected from colorants, pigments such as carbon black, stabilisers, acid scavengers, antioxidants and mixtures thereof.

Articles and Uses

The present polypropylene composition can be used for the production of articles such as molded articles, preferably injection molded articles. Furthermore, the present polypropylene composition can be used for the production of foamed articles such as foamed injection molded articles. Even more preferred is the use for the production of automotive articles, especially of automotive interior articles and exterior articles, like instrumental carriers, front end module, shrouds, structural carriers, bumpers, side trims, step assists, body panels, spoilers, dashboards, interior trims and the like. Preferably, the article is an automotive interior article.

The present invention thus refers in another aspect to an injection molded article as well as a foamed article, preferably foamed injection molded article, comprising the polypropylene composition as defined herein.

As already described above, the polypropylene homopolymer (H-PP1), as defined herein, advantageously reduces the stiffness reduction factor of a foamed injection molded article.

Thus, the present invention refers in another aspect to the use of a polypropylene homopolymer (H-PP1) for reducing the stiffness reduction factor of a foamed injection molded article by at least 40 as determined by the difference of the flexural modulus measured according to ISO 178 of the non-foamed and foamed injection molded article and compared to an article comprising the same amount of a polypropylene which has been polymerized in the presence of a Ziegler-Natta catalyst, wherein the polypropylene homopolymer (H-PP1) has
 i) a melting temperature Tm measured by differential scanning calorimetry (DSC) in the rage from 150 to 160° C.,
 ii) a content of 2,1 erythro regiodefects as determined from $^{13}C$-NMR spectroscopy in the range from 0.50 to 1.00 mol.-%,
 iii) an isotactic triad fraction (mm) determined from $^{13}C$-NMR spectroscopy of at least 97.5%, and
 iv) a xylene cold soluble fraction (XCS) determined at 23° C. according ISO 16152 of equal or below 1.5 wt.-%

With regard to the polypropylene homopolymer (H-PP1) and preferred embodiments thereof, it is referred to the statements provided above when discussing the polypropylene homopolymer (H-PP1) present in the polypropylene composition in more detail.

The present invention will now be described in further detail by the examples provided below.

EXAMPLES

1. Definitions/Measuring Methods

The following definitions of terms and determination methods apply for the above general description of the invention as well as to the below examples unless otherwise defined.

$MFR_2$ (230° C.) was measured according to ISO 1133 (230° C., 2.16 kg load).

The xylene cold solubles (XCS, wt.-%) were determined at 25° C. according to ISO 16152; first edition; 2005-07-01.

Intrinsic viscosity is measured according to DIN ISO 1628/1, October 1999 (in Decalin at 135° C.).

Quantification of Microstructure by NMR Spectroscopy

Quantitative nuclear-magnetic resonance (NMR) spectroscopy was used to quantify the comonomer content of the polymers. Quantitative $^{13}C$ {$^1H$} NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C$ $\{^{1}H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C$ $\{^{1}H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E \text{ [mol \%]}=100*fE$$

The weight percent comonomer incorporation was calculated from the mole fraction:

$$E \text{ [wt \%]}=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Flexural Modulus was determined in 3-point-bending according to ISO 178 on injection molded specimens of 80×10×4 mm prepared in accordance with ISO 294-1:1996.

DSC analysis, melting temperature ($T_m$), crystallization temperature ($T_c$), heat of fusion ($H_m$) and heat of crystallization ($H_c$): measured with a TA Instrument Q2000 differential scanning calorimetry (DSC) on 5 to 7 mg samples. DSC is running according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and heat of fusion ($H_m$) are determined from the second heating step.

Glass transition temperature Tg and storage modulus G' were determined by dynamic mechanical analysis (DMTA) according to ISO 6721-7. The measurements were done in torsion mode on compression moulded samples (40×10×1 mm3) between −100° C. and +150° C. with a heating rate of 2° C./min and a frequency of 1 Hz. While the Tg was determined from the curve of the loss angle (tan(δ)), the storage modulus (G') curve was used to determine the temperature for a G' of 40 MPa representing a measure for the heat deflection resistance.

Puncture energy and Energy to max Force were determined on plaques with dimensions 148×148×2 mm during instrumented falling weight impact testing according to ISO 6603-2. The test was performed at room temperature with a lubricated tup with a diameter of 20 mm and impact velocity of 10 mm/s.

Number average molecular weight ($M_n$) and weight average molecular weight ($M_w$) were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

Particle size $d_{50}$ and top cut $d_{95}$ were calculated from the particle size distribution [mass percent] as determined by gravitational liquid sedimentation according to ISO 13317-3 (Sedigraph).

Cell structure of the foamed parts was determined by light microscopy from a cross-section of the foamed injection-molded plate.

Total carbon emission was determined according to VDA 277:1995 from pellets.

Volatile organic content (VOC) is measured according to VDA 278, October 2011.

2. Examples

Synthesis of Metallocene:
The metallocene (rac-anti-dimethylsilandiyl(2-methyl-4-phenyl-5-methoxy-6-tert-butylindenyl)(2-methyl-4-(4-tertbutylphenyl)indenyl)zirconium dichloride) has been synthesized as described in WO 2013/007650. The metallocene containing catalyst was prepared using said metallocene and a catalyst system of MAO and trityl tetrakis(pentafluorophenyl)borate according to Catalyst 3 of WO2015/11135 with the proviso that the surfactant is 2,3,3,3-tetrafluoro-2-(1,1,2,2,3,3,3-heptafluoropropoxy)-1-propanol.

TABLE 1

Polymerization process conditions and properties of the polypropylene homopolymer H-PP1

| B1 Prepoly reactor | |
|---|---|
| Temp. (° C.) | 20 |
| Press. (kPa) | 5238 |
| B2 loop reactor | |
| Temp. (° C.) | 70 |
| Press. (kPa) | 5292 |
| H2/C3 ratio (mol/kmol) | 0.42 |
| Polymer Split (wt.-%) | 49.0 |
| MFR2 (g/10 min) | 91.0 |
| XCS (%) | 1.4 |
| B3 GPR | |
| Temp. (° C.) | 80 |
| Press. (kPa) | 2406 |
| H2/C3 ratio (mol/kmol) | 3.2 |
| Polymer Split (wt.-%) | 51.0 |

TABLE 1-continued

Polymerization process conditions and properties of the polypropylene homopolymer H-PP1

| MFR2 (g/10 min) | 71.0 |
|---|---|
| XCS (%) | 1.3 |

The polypropylene compositions were prepared by mixing in a co-rotating twin-screw extruder ZSK18 from Coperion with a typical screw configuration and a melt temperature in the range of 200-220° C. The melt strands were solidified in a water bath followed by strand pelletization.

TABLE 2

Overview of the composition for inventive and comparative examples IE1, IE2 and CE1

| | | IE1 | IE2 | CE1 |
|---|---|---|---|---|
| H-PP1 | [wt.-%] | 96.5 | 47.5 | |
| PP2 | [wt.-%] | | 49 | 96.5 |
| Additives | [wt.-%] | 3.5 | 3.5 | 3.5 |

H-PP1 is an isotactic unimodal polypropylene homopolymer of Borealis AG having a melt flow rate MFR$_2$ (230° C.) of about 71 g/10 min, prepared in the presence of a single-site catalyst as outlined in table 1.
PP2 is the commercial unimodal polypropylene homopolymer HJ120UB of Borealis AG having a melt flow rate MFR$_2$ (230° C.) of about 75 g/10 min, a Tm of 164° C., a density of 0.905 g/cm$^3$, and is prepared in the presence of a Ziegler-Natta catalyst.
Additives includes 1.5 wt.-% carbon black, 0.2 wt.-% of the nucleating agent Hyperform HPN-20E from Milliken & Company, 0.15 wt.-% of the antioxidant Irganox B215FF of BASF AG, Germany, 0.15 wt.-% calcium stearate, and 1.5 wt.-% of a carrier material.

The mechanical characteristics of the inventive examples IE1 and 1E2 and of comparative example CE1 are indicated in table 3 below.

TABLE 3

Characteristics of the prepared polypropylene (PP) compositions

| | | IE1 | IE2 | CE1 |
|---|---|---|---|---|
| Properties from pellets | | | | |
| MFR$_2$ | [g/10 min] | 70.4 | 67.6 | 75.3 |
| Total carbon emissions | μgC/g | 4 | 21 | 40 |
| VOC/FOG | μg/g | 17/79 | 98/317 | 170/506 |
| Tm | [° C.] | 156 | 161 | 165 |
| Tc | [° C.] | 123 | 127 | 129 |
| Tg | [° C.] | 2.0 | 0 | −2 |
| G' | [MPa] | 1030 | 910 | 1210 |
| Non-foamed injection molded plates, 2 mm | | | | |
| Flexural modulus | [MPa] | 1792 ± 16 | 1879 ± 25 | 1958 ± 20 |
| Puncture energy, 23° C. | [J] | 3 | 0.35 | 0.8 |
| Energy to max. force | [J] | 2.73 ± 1.35 | 1.28 ± 0.37 | 0.58 ± 0.39 |
| VOC | [μg/g] | 4 | 74 | 170 |
| Foamed injection molded plates, core back, 3 mm | | | | |
| Flexural modulus | [MPa] | 1107 ± 40 | 1153 ± 18 | 1191 ± 33 |
| Puncture energy, 23° C. | [J] | 2 | 1 | 2 |
| Energy to max. force | [J] | 0.64 ± 0.2 | 0.43 ± 0.09 | 0.43 ± 0.01 |
| Cell size | [μm] | 77 ± 19 | 99 ± 22 | 105 ± 22 |
| VOC | [μg/g] | 22 | 160 | 276 |
| Stiffness reduction factor (flexural modulus non-foamed - flexural modulus foamed) | | 685 | 726 | 767 |

From table 3, it can be gathered that foamed plates of IE1 have fine cells and lower stiffness reduction factor defined by the difference in stiffness of compact non-foamed and foamed part in comparison to the comparative example CE1. At similar melt flow rate (MFR) IE1 has also lower VOC/FOG then CE1 mainly due to the nature of the catalyst used to produce the polymer. IE1 can be used also as modifier for CE1. Addition of IE1 to CE1 (i.e. IE2) results in a lower stiffness reduction factor, improved emissions and finer cells.

The invention claimed is:

1. A polypropylene composition comprising:
   a) from 45 to 97.5 wt. %, based on the total weight of the composition, of a polypropylene homopolymer (H-PP1) having;
      i) a melting temperature Tm measured by differential scanning calorimetry (DSC) in the range from 150 to 160° C.,
      ii) a content of 2,1 erythro regiodefects as determined from $^{13}$C-NMR spectroscopy in the range from 0.50 to 1.00 mol. %,
      iii) an isotactic triad fraction (mm) determined from $^{13}$C-NMR spectroscopy of at least 97.5%, and
      iv) a xylene cold soluble fraction (XCS) determined at 23° C. according ISO 16152 of equal or below 1.5 wt. %,
   b) from 0 to 55 wt. %, based on the total weight of the composition, of a polypropylene (PP2),
   c) from 0 to 30 wt. %, based on the total weight of the composition, of a filler (F), and
   d) from 2.5 to 5 wt. %, based on the total weight of the composition, of at least one additive selected from the group consisting of colorants, pigments, carbon black, stabilisers, acid scavengers, nucleating agents, foaming agents, antioxidants and mixtures thereof,
   wherein the sum of the amount of the polypropylene homopolymer (H-PP1), the polypropylene (PP2), the filler (F) and the at least one additive in the polypropylene composition is 100.0 wt. %.

2. The polypropylene composition according to claim 1, wherein the composition comprises:
   a) from 95 to 97.5 wt. %, based on the total weight of the composition, of the polypropylene homopolymer (H-PP1), and
   b) from 2.5 to 5 wt. %, based on the total weight of the composition, of at least one additive selected from the group consisting of colorants, pigments, carbon black, stabilisers, acid scavengers, nucleating agents, foaming agents and mixtures thereof.

3. The polypropylene composition according to claim 1, wherein the composition comprises:
   a) from 45 to 52.5 wt. %, based on the total weight of the composition, of the polypropylene homopolymer (H-PP1),
   b) from 45 to 55 wt. %, based on the total weight of the composition, of a polypropylene (PP2), and
   c) from 2.5 to 5 wt. %, based on the total weight of the composition, of at least one additive selected from the group consisting of colorants, pigments, carbon black, stabilisers, acid scavengers, nucleating agents, foaming agents and mixtures thereof.

4. The polypropylene composition according to claim 1, wherein the composition has:
   a) a melt flow rate MFR$_2$ (230° C.) measured according to ISO 1133 in the range of 15.0 to 80.0 g/10 min; and/or
   b) a content of volatile organic compounds no greater than 170 μg/g composition in non-foamed injection moulded parts; and/or
   c) a content of volatile organic compounds no greater than 200 μg/g composition in pellet form; and/or
   d) a glass transition temperature Tg (measured with DMTA according to ISO 6721-7) of 0° C. or above.

5. The polypropylene composition according to claim 1, wherein the polypropylene (PP2) is a polypropylene homopolymer (H-PP2).

6. The polypropylene composition according to claim 1, wherein the polypropylene homopolymer (H-PP1) and/or the polypropylene (PP2) has/have a melt flow rate MFR$_2$ (230° C.) measured according to ISO 1133 in the range of 15.0 to 100.0 g/10 min.

7. The polypropylene composition according to claim 1, wherein the melt flow rate MFR$_2$ (230° C.) measured according to ISO 1133 of the polypropylene homopolymer (H-PP1) differs from the melt flow rate MFR$_2$ (230° C.) measured according to ISO 1133 of the polypropylene (PP2) by less than 20.0 g/10 min.

8. The polypropylene composition according to claim 1, wherein the polypropylene homopolymer (H-PP1):
   i) is unimodal, and/or
   ii) has a molecular weight distribution Mw/Mn measured according to ISO 16014 in the range of ≤4.0.

9. The polypropylene composition according to claim 1, wherein the polypropylene (PP2) has:
   i) a melting temperature Tm measured by differential scanning calorimetry (DSC) in the range from 162 to 170° C., and/or
   ii) a content of 2,1 erythro regiodefects as determined from $^{13}$C-NMR spectroscopy of ≤0.10 mol. %, and/or
   iii) an isotactic triad fraction (mm) determined from $^{13}$C-NMR spectroscopy in the range from 95.0 to 98.0%, and/or
   iv) a molecular weight distribution Mw/Mn measured according to ISO 16014 in the range of ≥4.0, and/or
   v) a xylene cold soluble fraction (XCS) determined at 23° C. according ISO 16152 in the range from 1.5 to 3.5 wt. %.

10. The polypropylene composition according to claim 1, wherein the composition has a bimodal molecular structure.

11. The polypropylene composition according to claim 1, wherein the filler (F) is selected from talcum, mica, wollastonite, glass fibers, carbon fibers and mixtures thereof.

12. An injection molded article comprising the polypropylene composition according to claim 1.

13. A foamed article, comprising the polypropylene composition according to claim 1.

* * * * *